US005405561A

United States Patent [19]

Dais et al.

[11] Patent Number: 5,405,561

[45] Date of Patent: Apr. 11, 1995

[54] PROCESS FOR MICROPERFORATING ZIPPERED FILM USEFUL FOR MANUFACTURING A RECLOSABLE ZIPPERED BAG

[75] Inventors: Brian C. Dais, Sanford; Jose Porchia, Midland, both of Mich.

[73] Assignee: Dowbrands L.P., Indianapolis, Ind.

[21] Appl. No.: 114,801

[22] Filed: Aug. 31, 1993

[51] Int. Cl.$^{6}$ .......................... B26F 1/24; B32B 31/00

[52] U.S. Cl. .................................. 264/40.1; 156/204; 156/252; 156/292; 156/258; 156/388; 156/513; 264/132; 264/152; 264/156; 264/248; 425/142; 425/290

[58] Field of Search ....................... 264/40.1, 132, 152, 264/153, 154, 155, 156, 288.8, 248, 252, DIG. 62; 425/289, 290, 142, 136, 140, 163; 428/35.2, 36.5; 383/63, 100–102; 156/204, 226, 292, 252, 258, 388, 513

[56] References Cited

U.S. PATENT DOCUMENTS

| | | | |
|---|---|---|---|
| 2,437,185 | 3/1948 | Brady et al. | 156/226 |
| 2,593,328 | 4/1952 | Meaker | 383/101 |
| 2,748,863 | 6/1956 | Benton | 264/156 |
| 3,146,283 | 8/1964 | Da Valle | 264/156 |
| 3,227,854 | 1/1966 | Ramsey et al. | 264/156 |
| 3,546,327 | 12/1970 | Ruda | 264/156 |
| 3,707,102 | 12/1972 | Huppethal et al. | 264/154 |
| 3,718,059 | 2/1973 | Clayton | 264/154 |
| 3,779,285 | 12/1973 | Sinibaldo | 264/156 |
| 4,063,641 | 12/1977 | Kvehn et al. | 156/204 |
| 4,419,159 | 12/1983 | Herrington | 156/204 |
| 4,561,109 | 12/1985 | Herrington | 428/35.2 |
| 4,618,383 | 10/1986 | Herrington | 383/63 |
| 4,666,536 | 5/1987 | Van Erden et al. | 156/204 |
| 4,667,552 | 5/1987 | Calligarich | 83/171 |
| 4,812,074 | 3/1989 | Ausnit et al. | 156/204 |

FOREIGN PATENT DOCUMENTS

| | | | |
|---|---|---|---|
| 2141688 | 1/1985 | United Kingdom | 383/100 |

*Primary Examiner*—Jay H. Woo
*Assistant Examiner*—Duane S. Smith

[57] ABSTRACT

A process for providing microperforations in a zippered film useful for manufacturing reclosable zippered produce bags including the steps of (a) providing a web of thermoplastic film with zipper profile members on at least one side of the web, the zipper profile members spaced apart on the web forming a central web area between the profiles;

(b) feeding the web between the nip of a cylinder having a plurality of heated pins and a pressure roller such that a plurality of microholes are formed in the central web area between the zipper profile members; and (c) maintaining the web in feeding alignment between the pin cylinder and the pressure roller such that uniform sized microholes are perforated in the web area between the profile members.

23 Claims, 6 Drawing Sheets

PROCESS FOR MICROPERFORATING ZIPPERED FILM USEFUL FOR MANUFACTURING A RECLOSABLE ZIPPERED BAG

BACKGROUND OF THE INVENTION

This invention relates to a process and apparatus for perforating a film of thermoplastic material and containers made therefrom. More particularly, this invention relates to a process and apparatus for microperforating a zippered film of thermoplastic material useful for manufacturing reclosable zippered produce bags.

Thermoplastic films, for example polyethylene films, have been used in many different applications including the packaging industry for making wraps for wrapping food articles or bags for storing food articles.

Non-microperforated zippered plastic containers or bags which feature reclosable fasteners are also well known and widely used by consumers for storage of foods. Typically, opposing rib and groove fastener elements (also called male and female profiles) on the container are pressed together or pulled apart to seal or open the container. An example of these reclosable containers or bags are ZIPLOC™ (trademark of DowBrands Inc.) brand bags.

Typically, the reclosable bag is made by first forming a film web stock, fusing profiles to the web stock integrally or separately, folding the web stock and then heat sealing the web stock to form the bag. Generally, the reclosable plastic bag is made from a clear thermoplastic film web or sheet typically of a polyethylene resin material. Thus, the resulting bag product is generally a clear plastic bag. Generally, the industry utilizes an extrusion die in which a closure profile of a thermoplastic resin is extruded and subsequently joined to the thermoplastic film web or sheet. Alternatively, the closure profile elements and sheet may be extruded as an integral unit from a single die whereupon the closure profile elements and sheet fuse to form an integral plastic container stock material.

The process of manufacturing the bag first involves forming a film web stock. Generally, a film web stock comprising an integrally fused closure member and film web is formed by first supplying a source of extrusion resin material for the closure member and the film web member to extruders. The extruders feed the resin into a die member to coextrude the closure device and film web integrally as the closure device and film web exit the die onto the surface of a chill roll. Air jets and an air knife are used to assure good contact of the film and closure device fastener elements with the chill roll. The film is pressed uniformly on the surface of the chill roll by the air jets and air knife. The air jets above the air knife pin the edges of the drawn film extrusion to the chill roll. Below the air knife preferably is located water jets which are aligned with each of the closure device fastener members to cool and shape the fastener members.

The closure integrally fused with the film web, herein web stock, is formed and chilled on the chill roll and from the chill roll, the web stock may go through a series of orientation, tension, nip and/or idler rolls to direct the web stock to pass through an apparatus for folding the web stock and joining the closure member profiles together to form a bag stock which is ready for severing and sealing into individual bag products.

The process of manufacturing thermoplastic bags or containers typically involves supplying a continuous web of the thermoplastic material which has been folded upon itself to form two plies to a means for severing and sealing the two plies into individual bag products. The bag stock is sent to a bag sealing machine or means for making the bag product such as described in U.S. Pat. No. 5,203,556. In forming individual bags, portions of the thermoplastic material are severed from the web. These severed areas become the side seams for the bags and are typically sealed at the same time as they are severed by the use of a heated wire element.

In some applications it is desirable for a thermoplastic film to be perforated to be used as wrap film, for example, in wrapping applications where air permeability through the wrap film is desirable. Therefore, such perforated wrap film can be used for wrapping produce such as vegetables and fruits wherein the free flow of air to the produce is desired to minimize early spoilage of the produce.

Typically, the thermoplastic film is perforated using a microperforator machine. Microperforator machines useful for perforating thermoplastic film are well known in the art such as described in U.S. Pat. No. 4,667,552.

The microperforator machines described in the prior art, for example, U.S. Pat. No. 4,667,552, are used to make microholes on flat non-zippered film after the film is manufactured. However, the known microperforators are not designed for processing film web stock with any protrusions, protuberances, ribs or profiles on the surface of the film web. More particularly, the known microperforators are not designed to accept a web stock having zippered profiles of the kind used to make zippered bags or containers. A problem with microperforating zippered film is the difficulty in obtaining uniform microholes across the surface of the zippered film. It is difficult to control the uniformity of the hole size especially when strict specifications are required for microperforating a film, for example, when a specific density and distance of the microholes is required for use in manufacturing a produce bag.

There is still a need in the industry to produce microperforated thermoplastic film containing zippered profiles with better control of microhole size on the web and to manufacture reclosable zippered bags from the microperforated zippered film material.

Accordingly, it is desired to provide a process and apparatus for microperforating a zippered web stock useful for making zippered reclosable produce bags. It is further desired to provide a continuous in-line perforating operation for zippered film and a process for producing a microperforated zippered bag.

SUMMARY OF THE INVENTION

One aspect of the present invention is directed to a process for preparing a microperforated zippered thermoplastic film web stock useful for producing a zippered produce bag by:

(a) providing a web of thermoplastic film with zipper profile members on at least one side of the web, the zipper profile members spaced apart on the web forming a central web area between the profiles;

(b) feeding the web between the nip of a cylinder having a plurality of heated pins and a pressure roller such that a plurality of microholes are formed in the central web area between the zipper profile members; and (c) maintaining the web in feeding alignment between the pin cylinder and the pressure roller such that uniform sized microholes are perforated in the central web area between the profile members.

Another aspect of the present invention is directed to a process for producing a microperforated zippered bag for storing produce by:

(a) providing a web of thermoplastic film with zipper profile members on at least one side of the web, the zipper profile members spaced apart on the web forming a central web area between the profiles;
(b) feeding the web between the nip of a cylinder having a plurality of heated pins and a pressure roller such that a plurality of microholes are formed in the central web area between the zipper profile members;
(c) maintaining the web in feeding alignment between the pin cylinder and the pressure roller such that the central web area between the profile members is microperforated in a uniform microhole size;
(d) folding the microperforated web to form two plies; and
(e) heat sealing the folded microperforated web to form a microperforated zippered bag.

Still another aspect of the present invention is directed to an apparatus for preparing a microperforated zippered thermoplastic film web stock useful for producing a zippered produce bag including:

(a) means for providing a web of thermoplastic film with zipper profile members on at least one side of the web, the zipper profile members spaced apart on the web forming a central web area between the profiles;
(b) means for feeding the web between the nip of a cylinder having a plurality of heated pins and a pressure roller such that a plurality of microholes are formed in the central web area between the zipper profile members; and
(c) means for maintaining the web in feeding alignment between the pin cylinder and the pressure roller such that the central web area between the profile members is microperforated in a uniform microhole size.

Yet another aspect of the present invention is directed to an apparatus for producing a microperforated zippered bag for storing produce including:

(a) means for providing a web of thermoplastic film with zipper profile members on at least one side of the web, the zipper profile members spaced apart on the web forming a central web area between the profiles;
(b) means for feeding the web between the nip of a cylinder having a plurality of heated pins and a pressure roller such that a plurality of microholes are formed in the central web area between the zipper profile members;
(c) means for maintaining the web in feeding alignment between the pin cylinder and the pressure roller such that the central web area between the profile members is microperforated in a uniform microhole sizer
(d) means for folding the microperforated web to form two plies; and
(e) means for heat sealing the folded microperforated web to form a microperforated zippered bag.

DETAILED DESCRIPTION OF THE PREFERRED EMBODIMENTS

Figure 1:
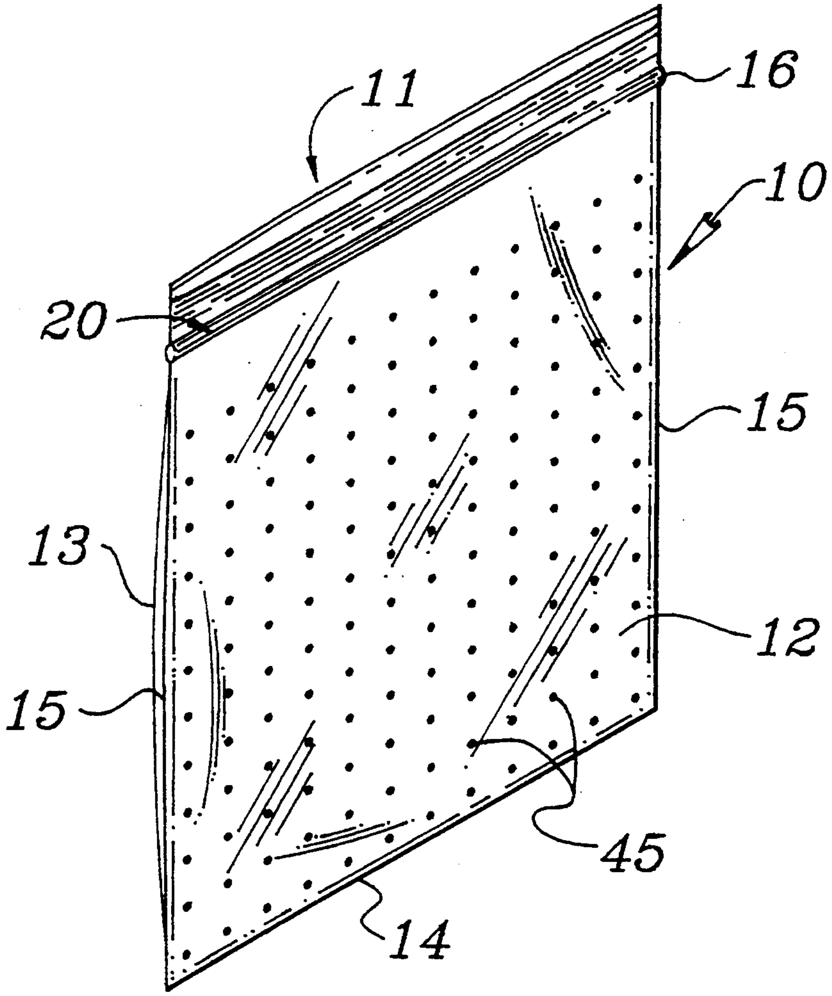
FIG. 1 is a perspective view of a microperforated bag of the present invention.

FIG. 1 shows a perspective view of a transparent and empty thermoplastic container 10 of the present invention with a plurality of microperforations or microholes 45. The container 10 has a reclosable opening 11 and sidewalls 12 and 13 which are typically thin, flexible, transparent plastic film which has been folded along bottom edge 14 and heat sealed along vertical side edges 15 to define a pouch or bag 10. It can be seen from FIG. 1 that sidewalls 12 and 13 of the bag 10 are microperforated, i.e., contain the plurality of microholes 45. The process of obtaining the microperforations in sidewalls 12 and 13 will be described in more detail below.

Figure 2:
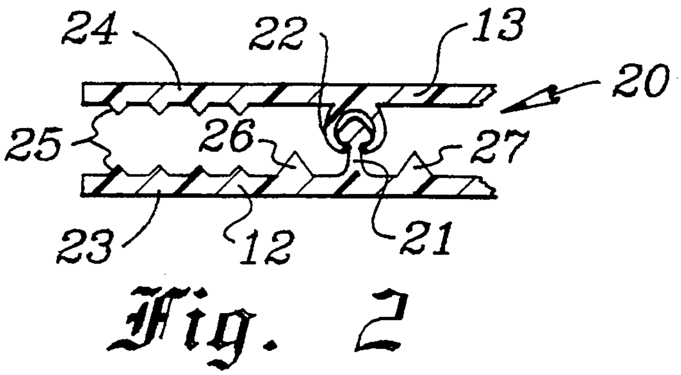
FIG. 2 is a cross-sectional view of one embodiment of zipper profiles which can be used in the bag of FIG. 1.
Figure 3:
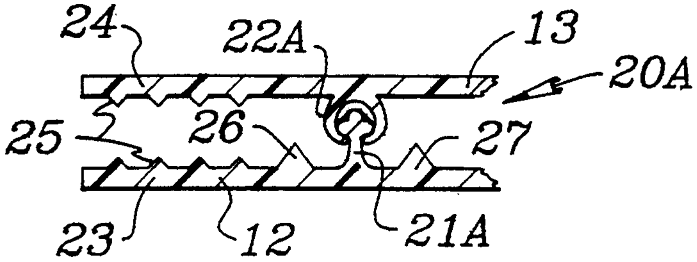
FIG. 3 is a cross-sectional view of another embodiment of zipper profiles which can be used in the bag of FIG. 1.

The bag 10 of the present invention includes a closure fastening device 20. The closure device 20 can be any type of closure conventionally known in the art, for example a zipper of the type described in U.S. Pat. No. 5,070,584, incorporated herein by reference. FIGS. 2 and 3 show examples of the closure device 20 used in the bag 10.

The embodiment of the closure device 20, shown in FIG. 2, includes rib type male and channel or groove type female closure profiles 21 and 22, respectively, which can be occluded and disengaged with respect to each other for closing and opening the bag 10. Closure profiles 21 and 22 are attached to the interior of sidewalls 12 and 13 along sidewall seal areas 16.

As shown in FIGS. 2 and 3, the bag 10 may also preferably include grasping flanges 23 and 24, with a grasping surface, in this instance grasping ribs 25 on the interior of grasping flanges 23 and 24 as described in U.S. Pat. No. 5,009,828, incorporated herein by reference.

As shown in FIGS. 2 and 3, adjacent the male profile 21 and 21A, the bag 10 may also preferably include rib members 26 and 27, referred to as "wide track" type rib members described in more detail in U.S. Pat. No. 4,736,486, incorporated herein by reference.

While not shown in the Figures, the sidewalls 12 and 13 of bag 10 may also be impressed or scored with a pattern such as a series of parallel diagonal lines across the interior or exterior surface of sidewalls 12 and 13 as described in copending U.S. patent application Ser. No.

08/084,654, filed Jun. 28, 1993 by Jose Porchia et al., incorporated herein by reference.

FIG. 3 shows another embodiment of a closure device of the present invention generally indicated as numeral 20A which includes rib type male and channel or groove type female closure profiles 21A and 22A, respectively, which can be occluded and disengaged with respect to each other for closing and opening the bag 10. In this embodiment, the closure profiles 21A and 22A which are attached to the interior of sidewalls 12 and 13 are those described in U.S. Pat. No. 5,070,584, incorporated herein by reference, which includes a deformed male profile 21A to provide an audible or clicking sound and/or a bumpy feel when the profiles are closed.

Figure 4:
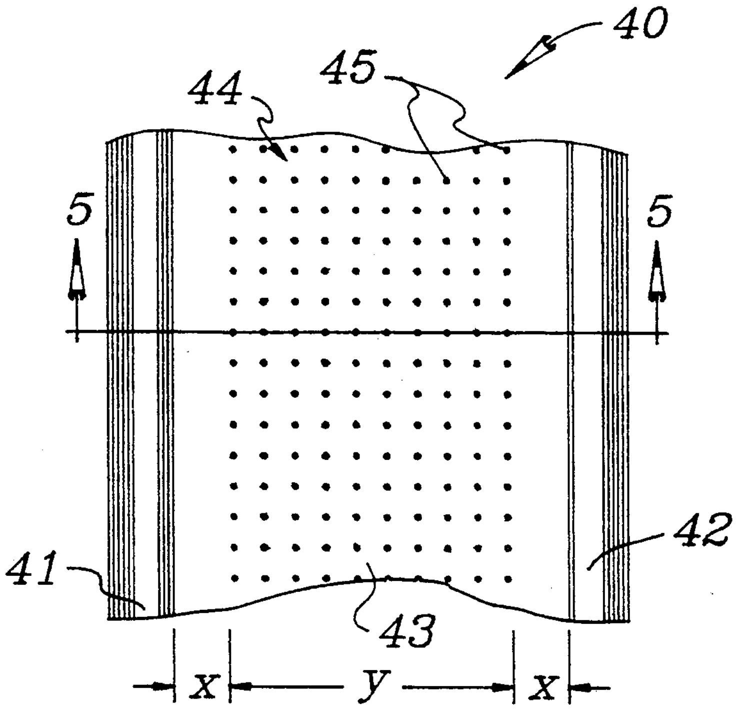
FIG. 4 is a plan view of a microperforated zippered film web used to make the bag product of FIG. 1.
Figure 5:
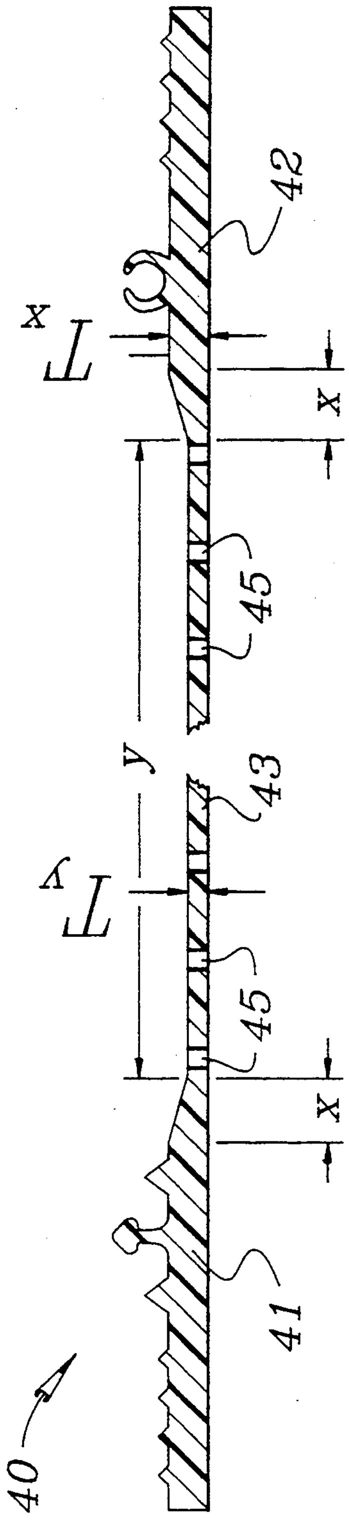
FIG. 5 is a cross-sectional taken along line 5—5 of FIG. 4.

The bag 10 of the present invention described above is preferably produced from a microperforated zippered film web stock, for example, as shown in FIGS. 4 and 5. In FIGS. 4 and 5, there is shown a zippered film web stock 40 used to make the bag 10 shown in FIG. 1. The web stock 40 comprises thickened portions 41 and 42 for the male and female profiles, respectively, which are integral with the thinner central portion 43 of the web 40. The thickened portions 41 and 42 are tapered toward the central web area 43, while the central web area 43 has a constant or uniform thickness. The web stock 40 has a pattern of microholes, the pattern generally indicated as numeral 44, and the microholes generally indicated as numeral 45.

The pattern of microholes, the size of microholes and the number of microholes on a bag are important factors in providing a perforated bag which can be preferably useful as a produce storage bag. A preferred produce bag with a preferred microperforated pattern is described in U.S. patent application Ser. No. 07/874,653 filed Apr. 27, 1992 by Jose Porchia et al., incorporated by reference.

The pattern of microholes 44 can be any pattern, in this case several rows of microholes in a square pattern. The pattern of microholes 44 is generally an array of lines of microholes 45 wherein the microholes 45 are spaced apart a distance from center to center, from about 0.2 inch to about 0.9 inch. The pattern of microholes 41 is centered in the web stock 40 between the profiles 21 and 22 preferably leaving a margin or spacing "x" between the pattern of microholes and each of the profiles from about 4/16 inch to about 12/16 inch.

It is important to avoid perforating the margin "x" because generally this area of the web is from two or more times thicker than the thickness of the film web center width "y". As shown in FIG. 5, the thickness of the margin, "$T_x$" is thicker than the thickness of the film web center width "$T_y$." Generally, the $T_y$ can be from about 1.5 to about 2 mils and $T_x$ can be from about 3 to about 10 mils.

As aforementioned, the bag 10 of the present invention will preferably be used for storage of produce, and in order for the bag to be utilized as a produce bag, the microholes in the sidewalls of the bag should be of a certain size and number. Generally, the microholes diameter on the bag can range from about 250 to about 900 microns, preferably from about 350 to about 700 microns and more preferably from about 400 to about 500 microns. The number of microholes preferably should be kept at from about 3 holes/in$^2$ to about 9 holes/in$^2$ and more preferably from about 5 holes/in$^2$ to about 7 holes/in$^2$.

Figure 6:
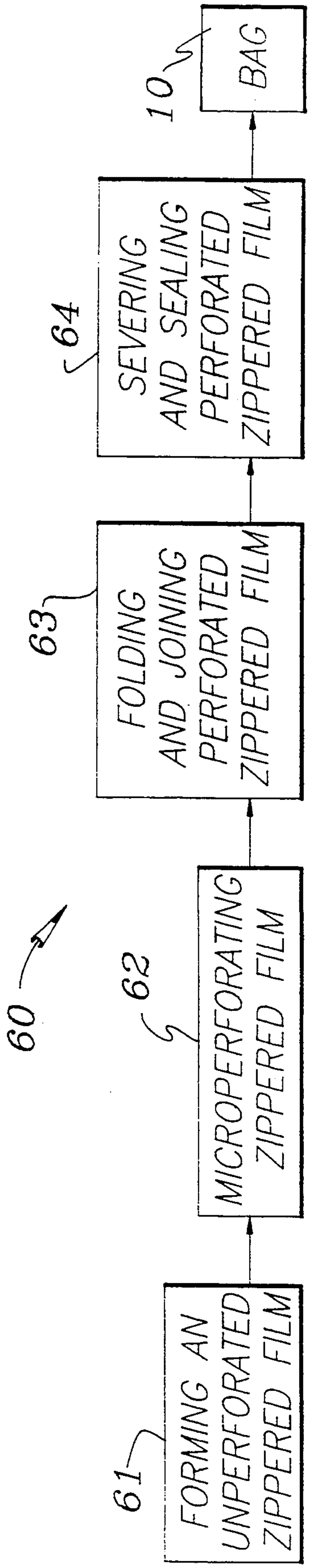
FIG. 6 is a flow diagram of a process of the present invention.

With reference to FIG. 6 there is shown a schematic flow diagram of carrying out a preferred process 60 for making a bag 10 of the present invention. Preferably, the preferred process of the present invention is a continuous process. In the preferred process an unperforated zippered film web stock supply is first produced by any conventional film forming apparatus and process means at 61. The unperforated zippered film web stock is then microperforated at 62. The microperforated zippered film is folded into two plies and the zipper profiles joined at 63. Next, the folded, microperforated film is severed and sealed at 64 to form individual bags 10.

Generally, to obtain the zippered film web stock at 61, a closure fastening device or zipper is attached to a non-zippered film web. Attaching a closure device to a film web stock material is well known in the art. For example, the film web stock materials and closure fastening devices employed in the present invention may be prepared by any suitable manufacturing method, such as by extrusion, by blow molding or other known methods of producing such film web stock materials and closure devices. The closure fastening device can be manufactured as a strip for later attachment to a film web stock material or the fastening device can be manufactured integral with the film web stock material For example, U.S. Pat. No. 4,736,496 describes a preferred integral method and U.S. Pat. No. 4,755,248 describes the post-applied method. Generally, the present closure device can be made from a heat sealable material and then attached to a heat sealable film so that a bag can be formed economically by heat sealing surfaces to form the bag. It is preferred that a method for producing plastic film with occludable closure fused thereto be employed.

While not shown in detail in FIG. 6, the process of forming an unperforated zippered film web at 61 may comprise integrally fusing a closure member and film web by first supplying a source of extrusion resin material for the closure member and the film web member to extruders. The extruders feed the resin into a die to coextrude the closure device and film web integrally as the closure device and film web exit the die onto the surface of a chill roll. The closure integrally fused with the film web, herein zippered web stock, is formed and chilled on the chill roll and from the chill roll, the zippered web stock may go through a series of orientation, tension, nip and/or idler rolls to direct the zippered web stock to pass through a microperforator machine for microperforation of the web stock at 62.

With reference to FIG. 6 again, the unperforated zippered film web stock is fed into a film perforation apparatus or microperforator means at 62 which provides a plurality of microperforations in the web stock to form a microperforated zippered web stock. The microperforated web stock is produced generally by passing the unperforated zippered web stock in between the nip of a pin roll and a counter pressure roll of the microperforator machine to form a film web stock with a plurality of microholes thereon (FIG. 4).

The resulting microperforated zippered film web stock with a series or pattern of microholes is then passed through a folder joint apparatus at 63 which folds the microperforated film web stock and occludes the fastener closure member profiles together to form a microperforated zippered folded bag web stock which is ready for severing and sealing into individual bag products 10. The bag web stock from 63 is then fed into a bag sealing machine at 64 or other means for making the bag product 10 wherein the web stock is severed and sealed to form individual bag products 10. The bag sealing machine at 64 is well known in the art as described in U.S. Pat. No. 5,203,556 incorporated herein by reference.

The dimensions of the bag and the closure fastening device may vary in accordance with the intended use.

The bags and closure fastening devices employed in the present invention may be prepared from any suitable packaging material. Typical packaging materials include, for example, polymeric materials, preferably those such as polyethylene, polypropylene, polyvinyl chloride, polyvinyl acetate, polyamides, polyvinylidene chloride, and mixtures or copolymers thereof.

Figure 7:
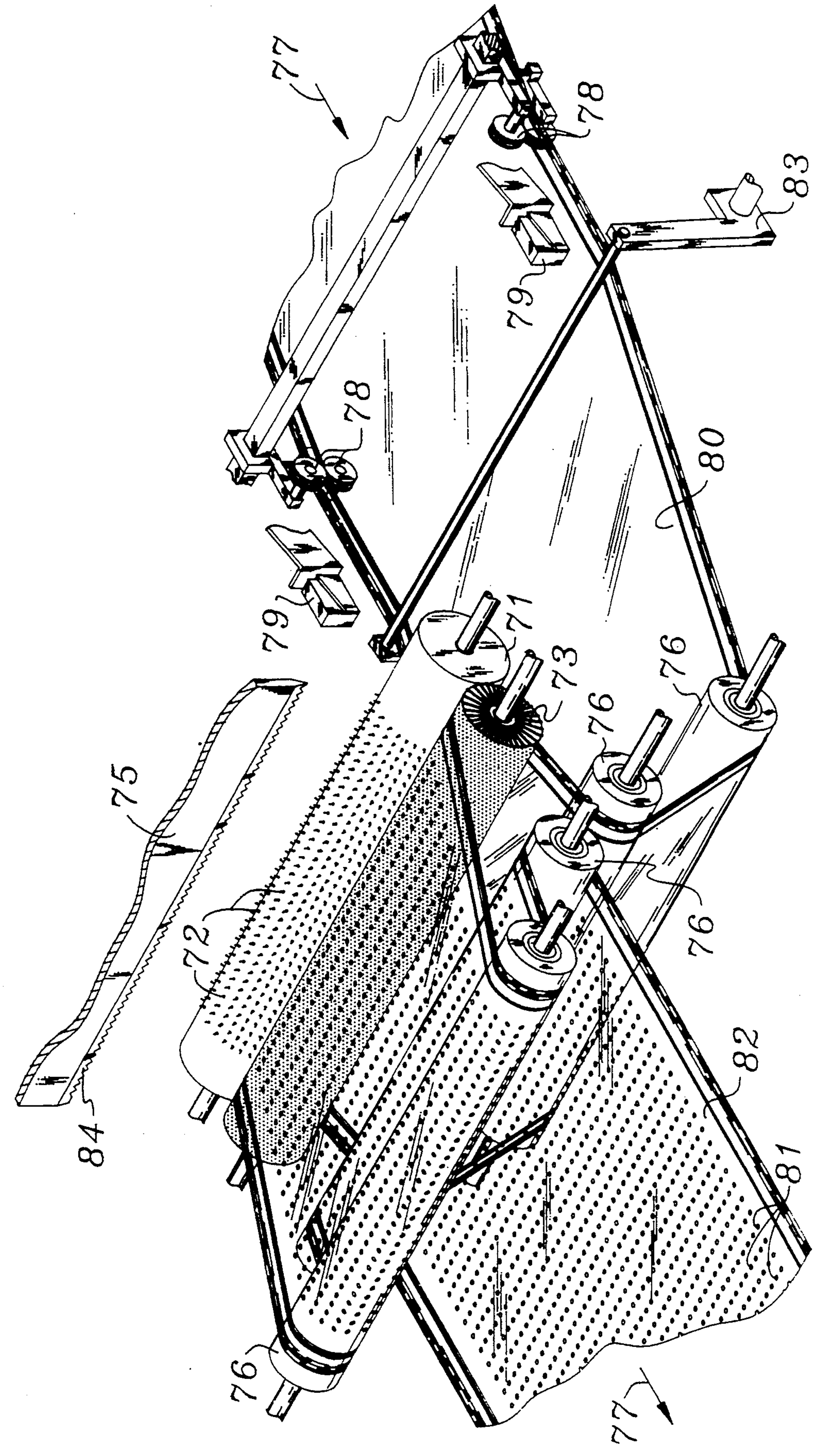
FIG. 7 is a perspective view of a microperforator apparatus used to perforate a zippered film web.
Figure 8:
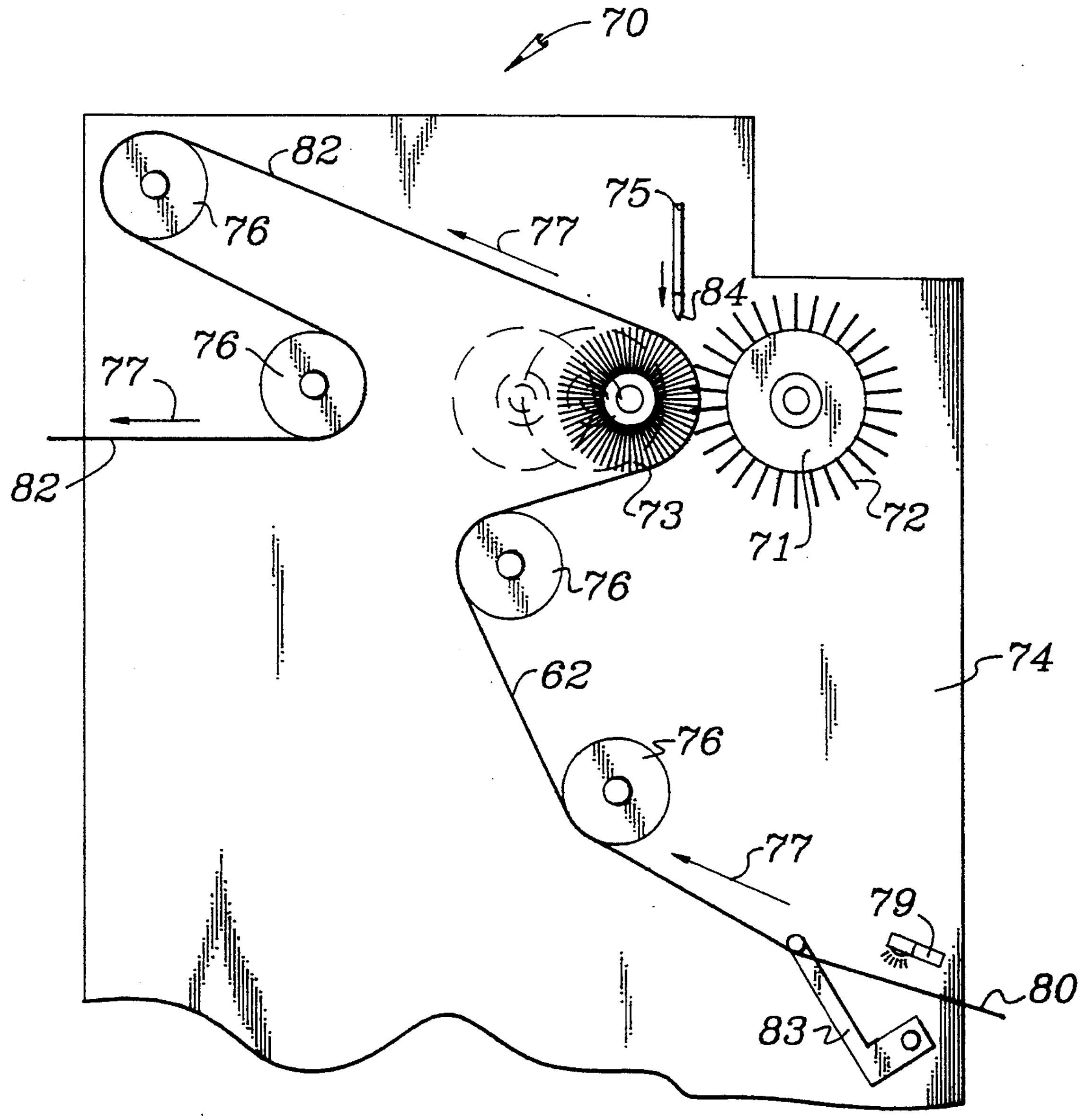
FIG. 8 is a schematic view of the microperforator apparatus of FIG. 7 used to perforate a zippered film web.

A means for continuously microperforating the surface of a film web stock useful for making a reclosable bag of the present invention is shown in more detail in FIGS. 7 and 8. FIG. 7 is a perspective view of one embodiment showing a portion of a microperforator machine, generally indicated by numeral 70, and FIG. 8 is a schematic side view of the microperforator 70. An unperforated zippered film web stock 80 is fed to the microperforator 70. The microperforator 70 provides a plurality of microholes 81 in the web stock 80 to form a microperforated web stock 82 useful for making bags in a subsequent sealing operation.

As shown in FIGS. 7 and 8, the microperforator machine 70 includes a rotatable cylindrical, elongate hot pin perforator roll or cylinder 71 having a plurality of heated pins 72 on the surface of the cylinder 71. The pins 72 are heated by any conventional heating means, for example as described in copending U.S. patent application Ser. No. 07/938,061 now abandoned, filed Aug. 31, 1992 by Calligarich et al., incorporated herein by reference. The temperature of the heated pins 72 is generally from about. 200° F. to about 500° F. The hot pin cylinder 71 is located in proximity to a rotatable cylindrical, elongate pressure roller (herein referred to as the brush roller) 73. The hot pin cylinder 71 cooperates with the brush roller 73 to effect the perforation of the zippered web of thermoplastic film material 80 fed therebetween.

The hot pin cylinder 71 contains a plurality of individual tapered heated pins 72 radially mounted along the outside cylindrical surface of the cylinder 71. If desirable, a constant diameter pins rather than tapered pins can be used so the hole can only be formed at one diameter and is not so dependent on depth of the pin into the film.

The hot pin cylinder 71 is appropriately journaled for rotation about its axis to bring the heated pins 72 into operative engagement with the web of thermoplastic film material 80. The pins 72 are all positioned at the same radial distance from the axis of the cylinder 71. The heated pins 72 penetrate into the film 80 and into the brush roller 73 to perforate the film as both the film 80 and the hot pin cylinder 71 are moving.

The brush roller 73 is mounted for rotation about its own axis and on the side of the film 80 opposite from the pins 72. The brush roller 73 is provided with a surface against which the film 80 is supported as the film travels through the microperforator 70 but into which the individual pins 72 may penetrate. The surface of the brush roller 73 could be of any material which could support a flexible plastic film but yet which would permit the penetration of the pins 72. The material of the brush roller 73 could be a highly resilient material, a bristle-like material, a flexible screen material or any other material which will provide a similar type of function. The brush roller 73 should also be made of a material which can function at the elevated temperatures of the hot pins 72 because the brush roller 73 contacts the hot pins 72. Preferably, the surface of the brush roller 73 is made up of upstanding bristles presenting a dense brush-like surface that will support the film 80 while allowing the hot pins 72 to perforate the film 80 and extend into the brush roller 73.

The brush roller 73 may contain grooves (not shown) for accommodating the zipper profiles in web 80. Other rollers used in the present invention may include grooves where necessary to protect the zipper and improve film flatness during the needle penetration. Maintaining the film flat helps and improves uniformity of hole diameter.

In carrying the operation of microperforation of the present invention, the unperforated zippered film 80 is fed into the bite between the brush roller 73 and the hot pin cylinder 71. Using an actuator, such as a ram or cylinder (not shown), which could be air or hydraulically actuated, from a retracted position the brush roller 73 forces the film 80 into contact with the hot pins 72. The brush roller 73 is a counter pressure means for holding the film 80 into contact with the hot pins 72 as well as gauging how deeply the hot pins 72 will pierce the film 80. Gauging may be accomplished by using, for example, micro adjusters (not shown). When the microperforator 70 is in operation, the heat shield 75 is in a retracted position. The microperforation process can be carried out in a continuous manner.

Microperforating the film 80 occurs when a representative hot pin 72 projects through the web of film 80 piercing the film 80 and extending into the brush roller 73. As aforementioned, the surface of the brush roller 73 is made up of upstanding bristles presenting a dense brush-like surface that will support the film 80 while allowing the hot pin 72 to perforate the film 80 and extend into the brush roller 73. The space between the brush roller 73 and the hot pin cylinder 71 can be adjusted through actuation of an adjusting means, that can move in small increments to affect the gap between the film 80 and the hot pins 72, that is, the depth of penetration of the pins through the film is thereby adjusted. A more controlled adjustment can be made by micro adjusters. Since the hot pins are tapered, larger perforations will be made as the film 80 moves up the length of the hot pin 72. An alternative embodiment would have hot pins with piercing ends but straight sides beyond or inboard of the piercing end. This could allow the hot pin to contact the hole edges for a longer dwell and thus affect the characteristics of the perforation, specifically making the hole size less dependent on the depth of the pin.

A full penetration of the pins 72 into the film 80 is not required, for example, a penetration of 1/16 to 3/16 of an inch has been found to work for thermoplastic film materials used in the present invention. For this reason, the brush roller 73 is preferably mounted for movement toward and away from the hot pin cylinder 71 thereby to allow for an adjustment of the penetration of the pins 72 into the film 80.

It has been found that variations in temperature can, to some degree, control the size of the perforations formed in the film material as can variations in the degree of penetration of the pins 72 into the film 80. Accordingly, the size of the openings formed in the film can be varied by varying the penetration of the pins, varying the temperature of the pins, varying the pin size and varying the time of insertion. Of course, different film materials, both in thickness and in chemistry, will have different responses.

Both the hot pin cylinder 71 and brush roller 73 are mounted in a frame 74 in appropriate bearing means (not shown) and rotated by any conventional drive means in coordinated movement to ensure that the cylinder 71 and the brush roller 73 travel at the appropriate peripheral speed and to ensure that the film material 80 is maintained in contact with the surface of the brush roller 73 as the film 80 moves with the required linear speed through the microperforator 70.

It is preferred to position the hot pin cylinder 71 in substantially horizontal alignment (when viewed in cross-section) with the brush roller 73 as shown in FIG. 8 or any other position. Preferably, the path of the film 80 wraps around the brush roller 73 whereby the direction of penetration of the hot pins into the film 80 is in a substantially horizontal plane parallel to ground level. Horizontal alignment of the hot pin cylinder 71 relative to the brush roll 73 is preferred to reduce or substantially eliminate the potential for volatile condensation in the enclosure of the hot pin cylinder 71 or brush roller 73. The horizontal alignment minimizes a fire hazard in the enclosed microperforator 70. Optionally, an exhaust means (not shown) may be used in conjunction with the microperforator 70 to aid in removing any smoke generated in microperforator 70.

It is desirable to provide a slideable heat shield means 75 which can be placed between the hot pin cylinder 71 and the brush roller 73 in order to shield the film 80 from the heat of the hot pin cylinder 71, when the microperforator 70 is not in operation. The heat shield means 75 is preferably a plate of a thermal barrier comprising a reflective surface over any conventional insulating material. It would be detrimental to the film being processed, which in an expected embodiment would be a synthetic thermoplastic film material, if the film were left in contact with the hot pins of the hot pin cylinder 71. A polyethylene or polypropylene film, for example, would melt or at least significantly deform. In order to prevent such deleterious action, a means is also provided in the present invention for moving the brush roller 73 away from the hot pin cylinder 71, allowing the film 80 to be pulled away from the hot pin cylinder 71 while simultaneously inserting the heat shield 75 between the hot pin cylinder 71 and the brush roller 73. An activator (not shown) attached to the brush roller 73 will slide the brush roller 73 away from the hot pin cylinder roll 71 to make room for the heat shield 75 which is lowered in between the hot pin cylinder 71 and the brush roller 73.

In a preferred embodiment, a means is provided to slide the heat shield 75 in position between the hot pin cylinder 71 and the brush roller 73 and to move the brush roller 73 away from the hot pin cylinder 71 or position the brush roller 73 against the hot pin cylinder 71.

The heat shield 75 would normally be in the retracted position as shown in FIG. 7 when the apparatus 70 is processing film, but can be actuated into position between the hot pin cylinder 71 and the brush roller 73 by any conventional actuating means, for example, using a bell crank means as described in U.S. Pat. No. 4,667,552, incorporated herein by reference. The heat shield 75 is slidingly carried in rails that allow the heat shield to slide into a position between the hot pin cylinder 71 and the brush roller 73.

In one embodiment of carrying out the process of the present invention for producing a microperforated film, a web of thin, flexible zippered thermoplastic film 80, is transported to, guided through and away from the microperforator 70 from production of the web in an in-line continuous operation. The film 80 is continuously moving and, at the same time, the film 80 is supported at a fixed distance relative to the perforating hot pins 72. The pins 72 are heated by a heating means to a temperature which will cause the thermoplastic film 80 to melt. The pins 72 are progressively moved by the hot pin cylinder 71. The pins rotate in a circular motion and, therefore, are in contact with the film during an arcuate path of the circular motion of the pins. The pins 72 are moved against the film 80 to penetrate into the film and are also moved at the same linear speed of the film, thereby to provide the possibility for a continuous process. The perforated film is then withdrawn from, the microperforator 70 for appropriate handling.

As shown in FIGS. 7 and 8, a series of conventional tensioning and alignment rolls 76 can be used for positioning and orienting the film 80 in the proper flow direction for perforating the film 80. The film 80 is threaded through the plurality of tensioning and alignment rolls 76 provided at various locations prior to and after microperforation of the film 80 to guide the film 80 from the feed-in point of the microperforator 70 to a rewind or take up roll (not shown) or a use point moving along a flow path in the direction generally indicated by arrow 77.

The microperforator 70 may be used off-line as a separate operation by using a supply roll (not shown) constituting the source of unperforated zippered web material and a take-up roll (not shown) disposed on the outfeed side of the microperforator 70 to re-roll the perforated film subsequent to the perforation operation.

The embodiment shown in FIG. 7 and 8 is a preferred alternative of using a microperforator 70. The microperforator 70 is preferably placed in-line in a continuous process for producing a perforated zippered web of thermoplastic film material. The microperforator 70 is positioned subsequent to production of the zippered web of film and after microperforating such film, the zippered film is sent to a use point, for example, to a process and fabricating machine for making zippered bag product or to a point for another processing step.

With reference to FIGS. 7 and 8, again, the hot pin microperforator 70 includes a means for maintaining the position of web 80 over the hot pins 72 such that the web area between the profiles is centered over the pins 72. For example, in this instance, a conventional guiding means such as guide wheels 78 (FIG. 7), are used to prevent the web from deviating more than about 1/32 inch to about 3/32 inch from either of the zipper profiles. An edge detecting means 79 is used to detect whether or not the web 80 is in proper position over the hot pins 72. If the edge detector 79 does not detect the web edge at the proper location during operation of the microperforation, an automatic actuator disengages the brush roller 73 from the hot pin cylinder 71 to avoid misalignment of the perforations on the web material and prevent continued misperforation of the web 80.

A web detection device 83 may also be used for detecting amount of tension on web 80 or the presence of web 80 feeding the nip of the microperforator 70. The detector 83 detects a condition, such as no tension, or slack in the web or no presence of web, that can lead to "wrap-up" of the film. The detector 83 sends a signal to an actuator (not shown) to automatically disengage the brush roller 73 from the hot pin cylinder 71 to prevent the film from wrapping around the hot pin cylinder 71, i.e., "wrap-up" which can lead to ignition of the web, i.e., a fire by prolonged contact of the web with the heated pin cylinder.

Optionally, an anti-wrap shield adjacent to the hot pin cylinder can be used in the microperforator to minimize wrap-ups of the film on the hot pin cylinder.

The fire hazard, while not totally eliminating it, can be reduced by optionally providing a means for cutting the film web once the wrap-up is detected. The film cutting means, in this instance, is advantageously provided by placing a cutting device 84 at the end of the heat shield 75. The cutting means 84 at the end of the heat shield 75 is used to prevent propagation of wrap-up by severing the film web 80 as the shield is lowered between the hot pin cylinder 71 and the brush roller 73.

The proper positioning of the web 80 over the pins is important because it assists in maintaining a uniform hole size across the entire web area between the profiles. A uniform hole size must be maintained for webs which will be used in preparing a produce bag for proper performance of the produce bag. The hole size consistency is due in part to keeping the holes between the thickened areas of the web between the profiles. As shown in FIG. 5, the web 40 (or web 80 in FIG. 7) may be twice or more the nominal thickness near the zippers. This thicker area is not perforated because the holes would have a different and uncontrollable diameter than the holes in the center position of the web. More heat would be necessary to perforate this area to the proper hole size. The holes tend to be consistent across the web because only the central position of the web having a uniform thickness is perforated.

In addition, by perforating evenly across the web, there are no large void areas present. Uniform perforations in the web translates to more uniform moisture control of vegetables stored in bags made from the perforated web.

Also, perforating only the central portion of the web between the profiles protects the zipper from potential damage from the heated pins.

Furthermore, guidance of the film web accurately and precisely over the pins allows flexibility in the manner in which the holes overlap when the web is folded and zipped. If the holes are perfectly centered across the web, they will overlay each other when the web is folded. The overlay distance can be adjusted by moving the web.

The means for centering the web over the pins can be accomplished by providing a means for laterally moving the incoming web, for example via the zipper guides wheels 78 as described above or other web guidance systems so the web can be centered over the pins on the stationary pin cylinder. In another embodiment, the microperforator 70 used for production of perforated zippered film may include a means for laterally shifting or moving the microperforator 70 itself or, alternatively, a means for laterally shifting or moving the hot pin cylinder 71, for example via slide means in order to center the web over the pins.

The lateral mobility means in the microperforator provides a more favorable bag appearance, by centering the holes on the bag so there is an equal amount of unperforated film below both the male and female profiles.

It is also optional to provide a scraper roller (not shown) to the microperforator to clean off carbon/plastic build-up on the pin cylinder.

In another embodiment, a pre-heating means (not shown) can be used to increase the available energy for perforating, for example, by adding an ultrasonic source prior to the hot pins. The ultrasonic unit will begin heat-up of the web and initial perforation of the film prior to final perforation by the hot pins.

In still another embodiment (not shown), one or more pins 72, at strategic locations on the pin cylinder 71, can be removed from the pin cylinder to provide a nonperforated surface area of a certain size to allow for the nonperforated surface area to be printed with information, designs or other indicia. The nonperforated surface area for printing can be on any portion of the bag product and at least on one sidewall of the bag product of the present invention. Preferably, the web surface area where printing is to take place, is surface treated by well known techniques such as corona treatment to enhance the adherence of the printing inks on the surface. Generally, the web surface area is, for example, up to about 2 inches in width and can be obtained, for example, by removing one or two rows of pins from the pin cylinder. In this instance, it is even more critical to have perfect alignment of the web feed through the microperforator in order to prevent perforation of the surface area to be printed because it would be undesirable to have ink transfer through any microholes formed in the printing surface area. Thus, proper positioning of the web through the microperforator should take into account the precise positioning of the pins over the nonperforated web surface to avoid perforating the printing surface area if printing is carried out prior to the microperforation process or the precise positioning of the microperforated web over the printing equipment to print only the nonperforated web surface after the microperforation process.

Figure 9:
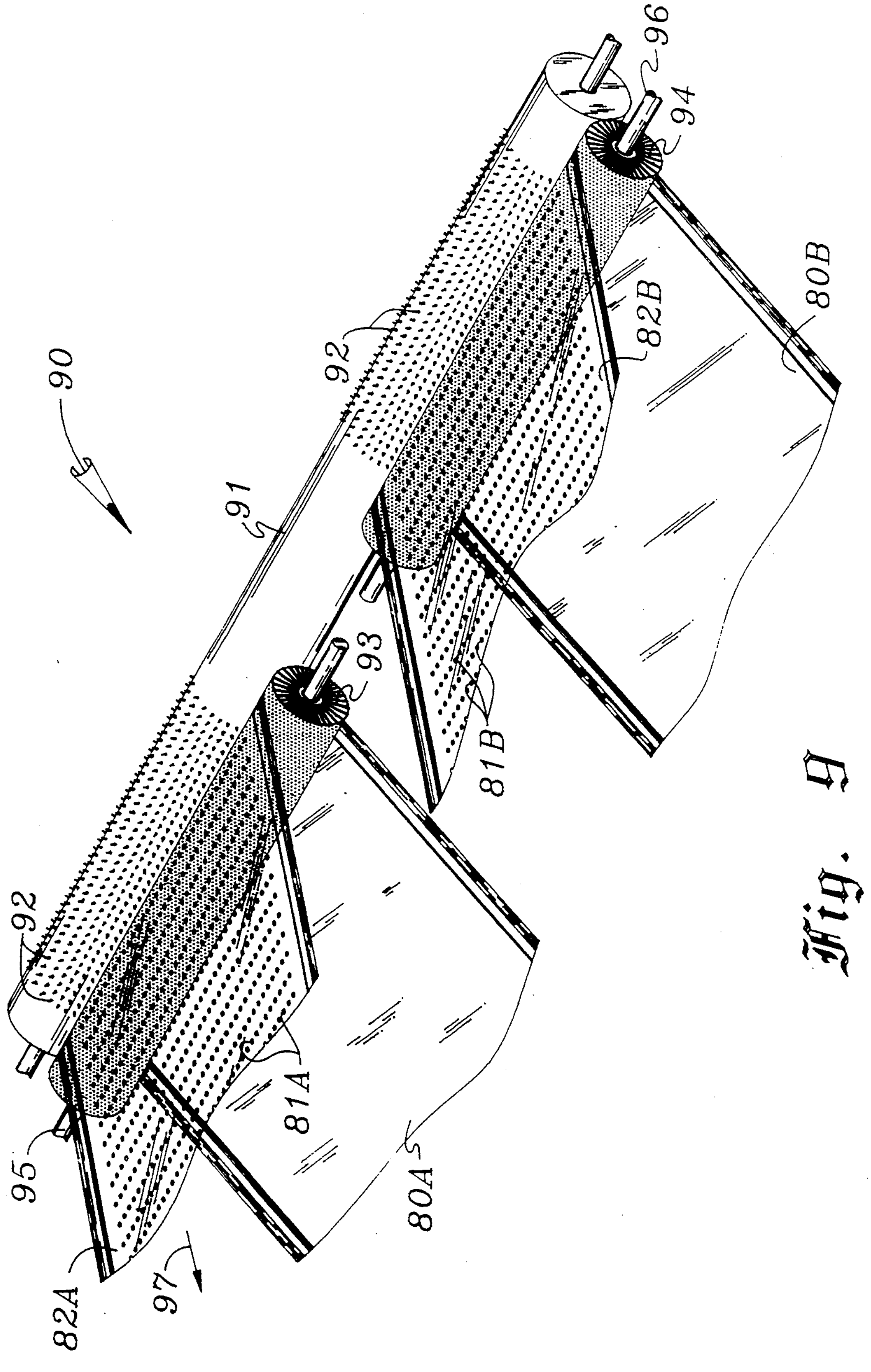
FIG. 9 is a perspective view of a portion of another embodiment of a microperforator apparatus used to perforate at least two zippered film webs.

With reference to FIG. 9, there is shown a preferred embodiment of a portion of a hot pin microperforator machine 90 including a rotatable cylindrical elongate hot pin perforator cylinder 91 having a plurality of heated pins 92 on the surface of the cylinder 91. In this embodiment, two separate rotatable cylindrical elongate brush rollers 93 and 94 on separate axis 95 and 96, respectively are provided for independently adjusting each brush roller and for feeding two, separate and apart, film webs 80A and 80B. Each brush roller 93 and 94 can be controlled individually to effect the perforation of webs 80A or 80B. Also, the microperforators 90 can be run more efficiently and economically when microperforating the two webs at the same time in parallel. In this embodiment, the two-web side-by-side system is utilized, for example, by using the single, wider pin cylinder 91 which will do the majority of heating but obtain different temperatures on each web, 80A and 80B, by fine tuning the temperatures with a separate bank of infrared lamps on each web (not shown) and by separating the brush roller in two pieces 93 and 94 so pin depth can be adjusted independently for each web. While not shown, the guidance system, i.e., the guide wheels 78, the detector means 79, the web tension detector 83, the idler rollers 76, and shield 75, may be used in the embodiment of FIG. 9 similar to the embodiment shown in FIG. 7, except that elements 78, 79, 76, 75 and 83 are duplicated in this embodiment to accommodate two webs, i.e., each web 80A and 80B will contain its own individual pieces of apparatus in order to form the microperforation 81A and 81B on webs 82A and 82B, respectively, as the webs are processed in the direction indicated with arrow 97.

EXAMPLE

Quart size (7 inches (17.78 cm) by 8 inches (20.32 cm) and 1.75 mil thick) vegetable storage bags are made on a production scale using the following steps:

(1) Two zippered film webs with profiles are extruded and cast from an integral profile die. Each set of profiles on the webs are spaced 16 inches apart.

(2) The cast film webs are passed through a cooling/drying tower.

(3) Sets of guide rollers are used to position the film webs correctly relative to the pins on a hot pin cylinder of a microperforator prior to feeding the web to the microperforator.

(4) The two guided webs are then fed into the nip between the hot pin cylinder and the brush roller of the microperforator to perforate the film webs.

The microperforator is designed to independently control the hole size of each web. Each web passes over its own separate and independent brush roller. The brush roller can be pressed against the pin cylinder such that the pins insert the film at the proper depth to produce the correct hole size for each web. During the production run, microholes with a nominal diameter of 475 microns are produced in each web.

As previously mentioned the hole size is varied by proper positioning of the brush relative to the pins and by controlling pin temperature. The machine is designed so the pins cannot be inserted too deeply. Minimizing the amount of penetration is important to minimize wrapups, to minimize carbon buildup on the pins by minimizing plastic contact, and to produce rounder holes without rips.

After the web is perforated, the webs are passed through a folding means and sealing means to form the quart size vegetable storage bags. The bag contained about 600 microholes (~5 holes/in$^2$).

Having described the present invention in detail and by reference to preferred embodiments therefore, it will be apparent to those skilled in the art that other modifications and variations to the present invention are possible without departing from the scope of the present invention defined in the appended claims. For example, the perforated web can undergo other processing steps such as impressing, printing, and the like, prior to folding the web and sealing the web into bags.

What is claimed is:

1. A process for preparing microperforated zippered thermoplastic film web stock useful for producing a zippered produce bag comprising the steps of:

(a) providing a web of thermoplastic film having a first side and a second side, with zipper profile members on at least one side of the web, the zipper profile members spaced apart on the web forming a central web area between the profiles;

(b) feeding the web between the nip of a cylinder having a plurality of heated pins and a pressure roller such that a plurality of uniform sized microholes are formed in the central web area between the zipper profile members:

(c) maintaining the central web area substantially flat during step (b) by accommodating the zipper profile members between the pin cylinder and the pressure roller; and (d) maintaining the web in feeding alignment between the pin cylinder and the pressure roller such that uniform sized microholes are perforated in the web area between the profile members.

2. The process of claim 1 wherein the web is maintained in feeding alignment by guiding the web stock with a guiding means.

3. The process of claim 1 including detecting the web for film wrap-up while continuously feeding the web film between the pin cylinder and the pressure roller.

4. The process of claim 1 including detecting the edge of the film web while continuously feeding the web film between the pin cylinder and the pressure roller.

5. The process of claim 1 including detecting tension of the film web while continuously feeding the film web between the pin cylinder and the pressure roller.

6. The process of claim 3 including severing the film web upon detecting wrap-up to prevent film from continuously feeding the nip of the pin cylinder and pressure roller.

7. The process of claim 1 wherein the film web is microperforated from about 4/16 inch to about 12/16 inch away from the profile members.

8. The process of claim 1 wherein the microholes are from about 250 microns to about 900 microns in diameter.

9. The process of claim 1 wherein the number of microholes is from about 3 holes/in$^2$ to about 9 holes/in$^2$ in number.

10. A process for producing a microperforated zippered bag for storing produce comprising the steps of:

(a) providing a web of thermoplastic film having a first side and a second side with zipper profile members on at least one side of the web, the zipper profile members spaced apart on the web forming a central web area between the profiles;

(b) feeding the web between the nip of a cylinder having a plurality of heated pins and a pressure roller such that a plurality of microholes are formed in the central web area between the zipper profile members;

(c) maintaining the web in feeding alignment between the pin cylinder and the pressure roller such that the web area between the profile members is microperforated in a uniform microhole size;

(d) folding the web to form two plies; and (e) heat sealing the folded web to form a microperforated zippered bag.

11. A process for microperforating a zippered thermoplastic film web useful for producing zippered bags for storing produce therein comprising the steps of:

(a) forming a web of plastic film having a first side and a second side, with zipper profiles on at least one side of the web, the zipper profiles spaced apart on the web forming a web center;

(b) guiding the web through a microperforating means;

(c) maintaining the web center substantially flat during step (b) by accommodating the zipper profiles; and (d) microperforating the web of plastic film in the web center between the profile members of the zipper.

12. A process for producing a microperforated zippered bag for storing produce therein comprising the steps of:

(a) forming the web of plastic film having a first side and a second side, with zipper profiles on at least one side of the web, the zipper profiles spaced apart on the web forming a web center;

(b) fusing a profile member on said web;

(c) guiding the web through a microperforating means;

(d) maintaining the web center substantially flat during step (c) by accommodating the zipper profiles;

(e) microperforating the web of plastic film in the web center between the profile members of the zipper;

(f) folding the web; and (g) heat sealing the folded web to form a zippered bag.

13. A process for microperforating a zippered thermoplastic film web comprising the steps of:

feeding a zippered film web between a hot pin perforator roll cylinder mounted for rotation in a frame means, said cylinder having a plurality of pins thereon, and a counter pressure roll mounted for rotation in said frame means adjacent said cylinder, said counter pressure roll mounted in said frame means relative to said cylinder such that the rotational axis of the counter pressure roll is in substantially horizontal alignment to the rotational axis of the cylinder;

heating said hot pin perforator roll cylinder such that the plurality of pins thereon are substantially heated to melt the film web when contacting the pins to cause a plurality of microperforations in the film web;

maintaining the film web between the profiles substantially flat by accommodating the zipper profile members between the hot pin perforator and the counter pressure roll; and guiding the zippered film through the nip of the hot pin perforator and counter pressure roll such that the holes are centered on the film web between the profiles of the zippered film.

14. The process of claim 13 being a continuous process.

15. The process of claim 1 including removing at least one pin from the pin cylinder to provide the bag with a non-perforated surface area for printing on the surface.

16. The process of claim 1 wherein multiple film webs are passed between the pin cylinder and pressure roller.

17. The process of claim 16 wherein the pressure roller comprises at least two separate rollers rotatable on separate axis for two webs.

18. The process of claim 1 including adjusting the depth of the pins for controlling the uniformity of the hole size.

19. The process of claim 10 including the step of passing said web through a pressing means for removing air entrapment between the plies for better sealing of the folded web.

20. The process of claim 1 including printing a label on the bag.

21. The process of claim 1 including monitoring the hole size to maintain the hole size at a uniform hole size while maintaining the web in feeding alignment.

22. The process of claim 1 including maintaining the tension on the web at a uniform tension while maintaining the web in feeding alignment.

23. The process of claim 3 including automatically backing the pressure roller away from the pin cylinder upon detecting the film wrap up.

* * * * *